United States Patent [19]

Philips

[11] 4,345,281
[45] Aug. 17, 1982

[54] INDICATOR FOR HEADROOM EXTENSION SYSTEM FOR TAPE RECORDERS

[75] Inventor: Peter Philips, Mineola, N.Y.

[73] Assignee: Harman-Kardon, Incorporated, Woodbury, N.Y.

[21] Appl. No.: 177,564

[22] Filed: Aug. 13, 1980

[51] Int. Cl.$^3$ .......................... G11B 5/47; G11B 27/36
[52] U.S. Cl. ......................................... 360/66; 360/31
[58] Field of Search .................... 360/66, 65, 68, 31, 360/25, 137

[56] References Cited

PUBLICATIONS

"Dolby HX New Noise Reduction" by Leonard Feldman, Radio Electronics, vol. 50, #12, 12/79.

"Audiolevel Indicators"—Wm. Pleass, Practical Wireless, vol. 53, #6, 10/77.

Primary Examiner—Vincent P. Canney
Attorney, Agent, or Firm—Hopgood, Calimafde, Kalil, Blaustein & Judlowe

[57] ABSTRACT

A visual indicator for a tape or cassette recorder, which includes a noise-reduction system which in addition to varying the amplitude level of the recorded signal also varies the high frequency pre-emphasis and the bias current applied to the tape. Decreasing the bias current when high amplitude, high frequency signals are present increases the headroom available on the tape. The visual indicator provides an indicator of the amount of headroom when recording.

5 Claims, 3 Drawing Figures

INDICATOR FOR HEADROOM EXTENSION SYSTEM FOR TAPE RECORDERS

BACKGROUND AND SUMMARY OF THE INVENTION

The present invention relates generally to tape recorders and specifically, to a visual indicator for indicating the amount of headroom available on the tape. "Headroom" is an indication of the amount of additional high-frequency signal that can be recorded on the tape, without the tape becoming saturated and usable to accept any more signal.

Tape recorders generally, and especially tape recorders utilizing compact cassettes in which the tape moves at a relatively slow speed, have suffered from insufficient signal-to-noise ratio and frequency response. In order to overcome these difficulties, a number of noise-reduction systems have been utilized. One commonly used noise-reduction system identified by the trademark "Dolby", pre-emphasizes low-amplitude, high-frequency signals in a predetermined manner before recording on the tape. During playback, the signals are de-emphasized in a predetermined manner opposite to that of the recording pre-emphasis. This pre- and de-emphasis of the signal provides a significant improvement in the signal-to-noise ratio of the recording media.

A further improvement which has recently been added to the Dolby system is known as the Dolby HX headroom extension system. In this system, the control signal usually employed to vary the amplitude of the high-frequency signals is utilized to inversely vary the bias being applied to the tape. When high-amplitude, high-frequency signals are detected, the bias signal is reduced. Simultaneously, the amount of recording pre-emphasis is reduced in order to compensate for the increase in sensitivity to high frequencies caused by the reduction in the recording bias field. The result of changing the bias and pre-emphasis parameters is an improvement in headroom of approximately 10 dB, while maintaining frequency response in accordance with international (IEC) standards.

However, the bias signal is reduced by the Dolby HX system only over a certain range because the bias oscillator current has a set minimum level. Thus, after a certain point, further high-amplitude, high-frequency signals will not cause a further reduction in bias. Thus, after the minimum bias level is reached, tape saturation may again take place. Accordingly, it is desirable that the operator of the tape recorder be aware when the maximum possible headroom extension of the noise reduction circuitry has been reached so that the recording level may be safely kept within the capabilities of the system.

It is accordingly an object of this invention to provide an indicator system for a tape recorder for use with noise reduction circuitry including a headroom extension feature.

It is a further object of this invention to provide an indicator system which signals the possible overload of the tape recorder headroom extension circuitry.

It is another object of this invention to provide an indicator circuit for use with a headroom extension system that indicates various stages in the operation of the headroom extension circuitry.

Still another object of this invention is to provide an indicator for use with tape recorder headroom extension circuitry that will not give confusing signals to the operator.

The invention as disclosed herein, provides an indication of the maximum capabilities of the system and also indicates the various stages in the operation of the headroom extension system to the operator. The indicator of the invention provides a series of three level indications. A first indication is given when the headroom extension circuitry is operating at or below a level that which will cause the bias current to be reduced. A second indication is given when the minimum bias threshold has been reached, to indicate that no further headroom extension can occur. A third indication is given that tape saturation is occurring to indicate that the recording levels should be reduced.

The indicator circuitry is designed so that only one of the indicator lights is lit at any particular time. This feature prevents the operator from becoming confused because of the simultaneous presence of a safety and a warning signal. This design also prevents the headroom extension circuit indicators from appearing similar to any recording level indicators.

BRIEF DESCRIPTION OF THE DRAWINGS

To the accomplishment of the above and such further objects as may hereinafter appear, the present invention relates to an indicator system for use with noise reduction circuitry of a tape recorder as set forth in the appended claims, and as described in the following specification as considered with the accompanying drawings in which:

DESCRIPTION OF THE PREFERRED EMBODIMENT

Figure 1:
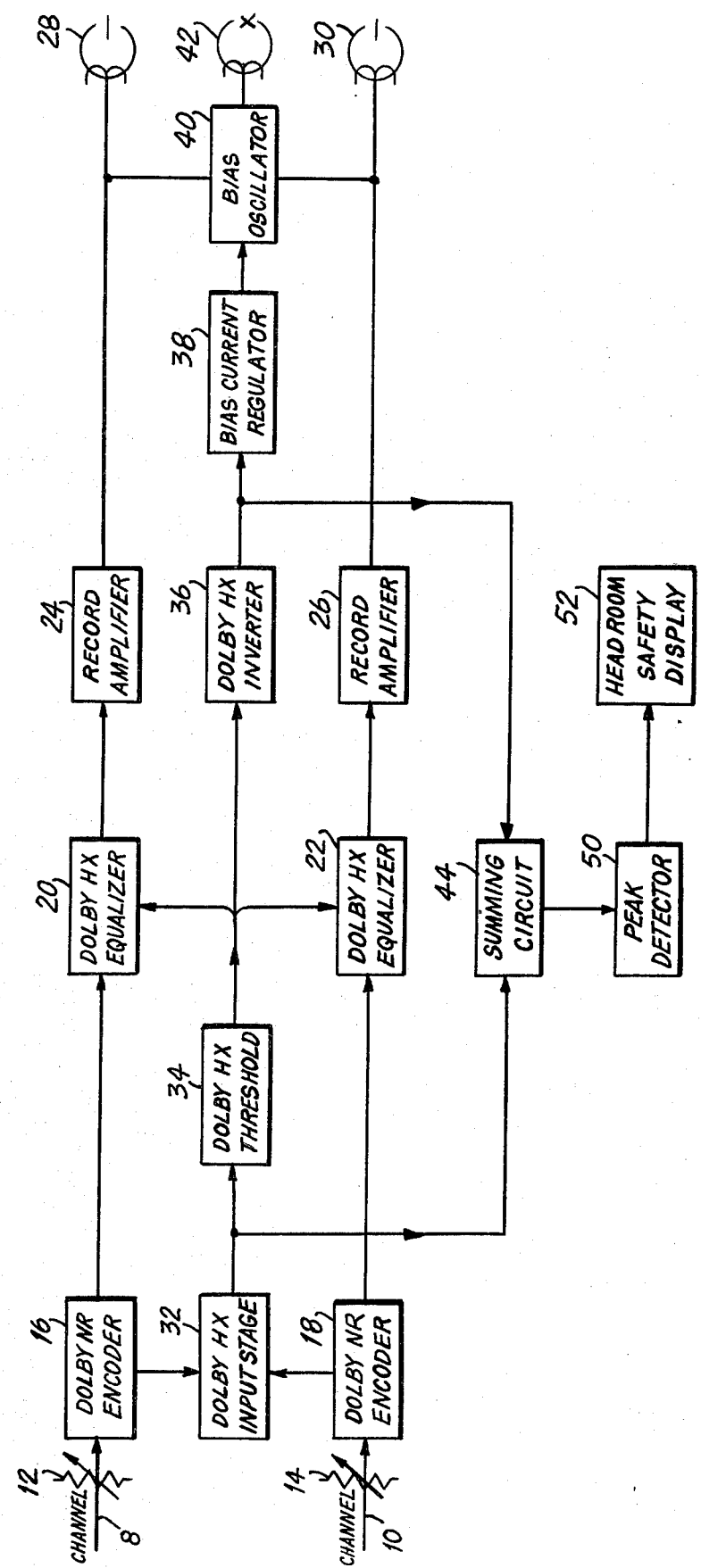
FIG. 1 is a block diagram of tape recorder with a headroom extension system including an indicator system in accordance with the instant invention.

The indicator circuit of the invention as shown schematically in FIG. 1, respectively, receives an input 8, 10 the left and right channels of audio signal. Controls 12 and 14, connected respectively to inputs 8 and 10 vary the input signal levels. Each channel includes a noise reduction (NR) encoder 16, 18 of the "Dolby" type which operates in the known fashion to detect the presence of, and to provide pre-emphasis (i.e., boost) low-amplitude, high-frequency signals. The pre-emphasis is inversely proportional to signal amplitude level; the lesser the amplitude the greater is the pre-emphasis and the higher the amplitude, the lesser is the pre-emphasis. At 0 dB level no pre-emphasis takes place. The headroom extension circuitry of the "Dolby HX" type includes equalizers 20, 22 whose function is described below. The output of equalizers 20,22 is connected to record amplifiers 24, 26 for each channel whose output is respectively fed to left and right recording heads 28, 30.

The outputs of encoders 16, 18 are applied to a "Dolby HX" input stage 32 which samples the signals for the presence of high-amplitude, high-frequency signals. A threshold circuit 34 connected to the output of input stage 32 will activate the "Dolby HX" headroom extension system at a predetermined signal level. The output of threshold circuit 34 is applied to equalizers 20, 22 in each channel which selectively de-emphasize the signal to compensate for the increased sensitivity to high-frequency signals caused by the reduction in bias as is described in greater detail below. The output of circuit 34 is also applied to an inverter 36, which inverts the signal of threshold circuit 34 so that the output of inverter 36 is inversely proportional to the amount of high-amplitude, high-frequency signals present. The output of inverter 36 is coupled to a bias current regulator 38 which reduces the amount of bias current supplied by a bias oscillator 40 to record heads 30, 28 and in most applications an erase head 42. Thus, the headroom extension system reduces the amount of bias current supplied to record heads 28, 30 and in most applications erase head 42 in the presence of high-amplitude, high-frequency signals to prevent saturation of the tape while the recording pre-emphasis is simultaneously reduced to compensate for the increase in high-frequency sensitivity due to the reduction in bias current.

A summing circuit 44 receives the output of Dolby HX input stage 32 as well as the output of inverter 36. The output of summing circuit 44 is applied to a peak detector 50 the output of which is applied to a headroom safety display 52. When the headroom extension circuitry is switched off, the bias current is set at a fixed level. When the high-frequency spectrum of the input signal exceeds the overload capability of the tape, a change in voltage will appear at summing circuit 44 and thus activate display 52.

When the headroom extension circuitry is switched on, any change in bias current will be inversely proportional to the change in high-frequency level (i.e., an increase in high-frequency level results in a decrease in bias level) and the sum of both changes remains zero over this range. At the moment the high-frequency level increases so that the bias current reaches its predetermined minimum, the sum of both changes will no longer remain zero. At this point, the summing circuit sends a signal to the peak detector 50 to provide an indication of the preset limitation within the headroom extension circuitry. The peak detector 50 includes a peak riding detector with a decay time constant of approximately two seconds so as to enable the operator to perceive any rapidly occurring activation of the headroom extension circuitry.

The indicator display 52, preferably includes three levels of indication: a first indication when the headroom extension circuitry is operating in its linear range, a second indication, when the bias current has been reduced to the predetermined minimum to indicate that no further headroom extension is possible and a third indication at a level slightly above that of the second level to indicate that tape overload is occurring. A larger amount of high-frequency energy is required to activate display 52 when the headroom extension circuit is switched on due to the automatic reduction in bias. Thus, the display shows the operator the headroom extension provided by the circuitry. The display circuit 52 is described in greater detail below.

Figure 2:
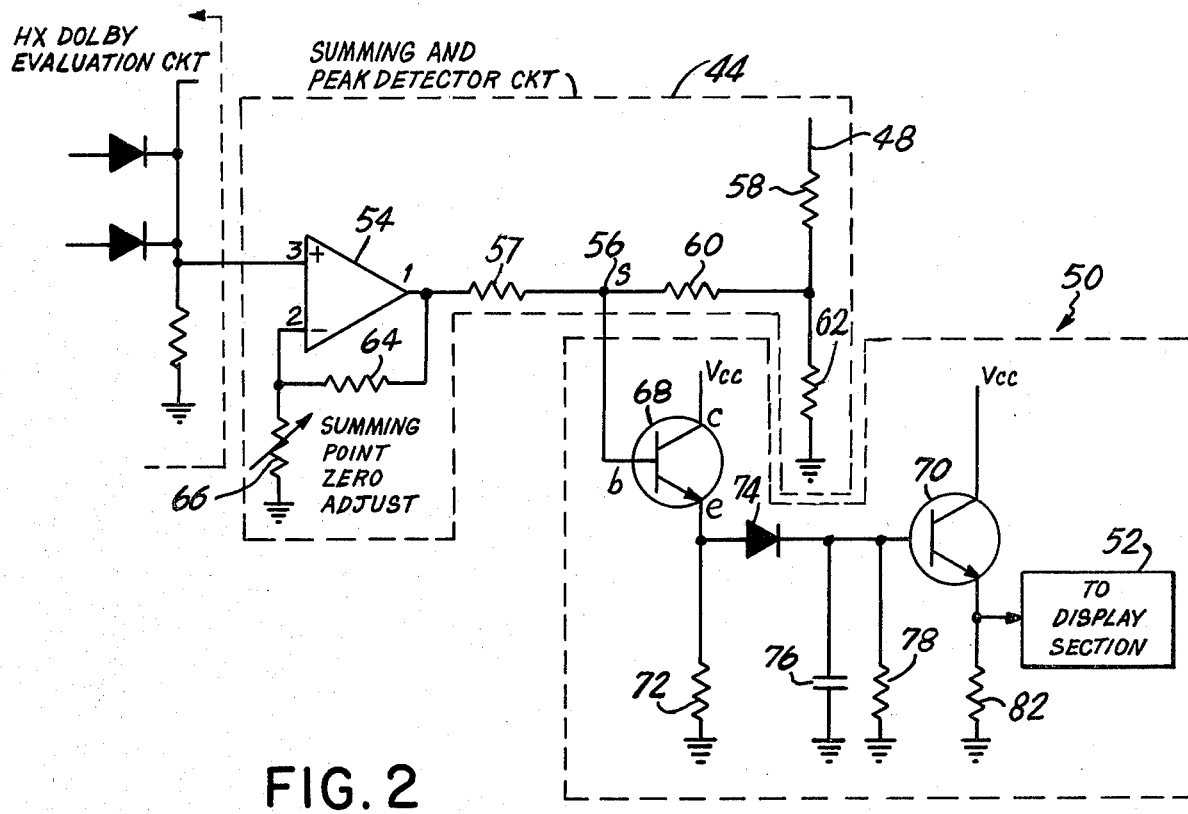
FIG. 2 is a schematic circuit diagram of the summing and peak detector of the instant invention.

Summing circuit 44 and peak detector 50 are shown in detail in FIG. 2. The output signal from input stage 32 which is the greater of the two headroom extension control voltages from the left and right channels is applied to the + input of a buffer amplifier 54. Amplifier 54 has a voltage gain of approximately five so that the output of the amplifier 54 matches the level of the signal obtained from the dividing network formed by resistors 58 and 62 connected to inverter 36. The signal obtained from inverter 36 is also the control voltage to the bias current regulator. The output of amplifier 54 is connected to a summing point 56 through a resistor 57. The signal from inverter 36 is divided by resistors 58 and 62 and is connected to summing point 56 through a resistor 60. A fixed resistor 64 and a variable resistor 66 are connected from ground to the − input of amplifier 54 and form the means for varying its gain. Resistor 66 is adjusted to vary the gain of amplifier 54 so that at those ranges of values where the headroom extension system in linearly varying the bias current, there will be no voltage change appearing at point 56.

NPN transistors 68, 70 and associated components form peak detector circuit 56. The base of transistor 68 is connected to point 56, the collector to Vcc, and the emitter is connected both to ground through a resistor 72 and to the base of transistor 70 through a diode 74. The base of transistor 70 is also connected to ground through a capacitor 76 and a parallel resistor 78. The collector of transistor 70 is connected to Vcc, and the emitter is connected to display 52 through conductor 80 and to ground through a resistor 82. The values of the resistors and the capacitor of peak detector circuit 50 are adjusted so that this circuit has a decay time constant of approximately two seconds. This permits the operator to observe the operation of the headroom extension circuitry on short duration, high-frequency peaks which would normally be too rapid for a perceptible visual indication.

Figure 3:
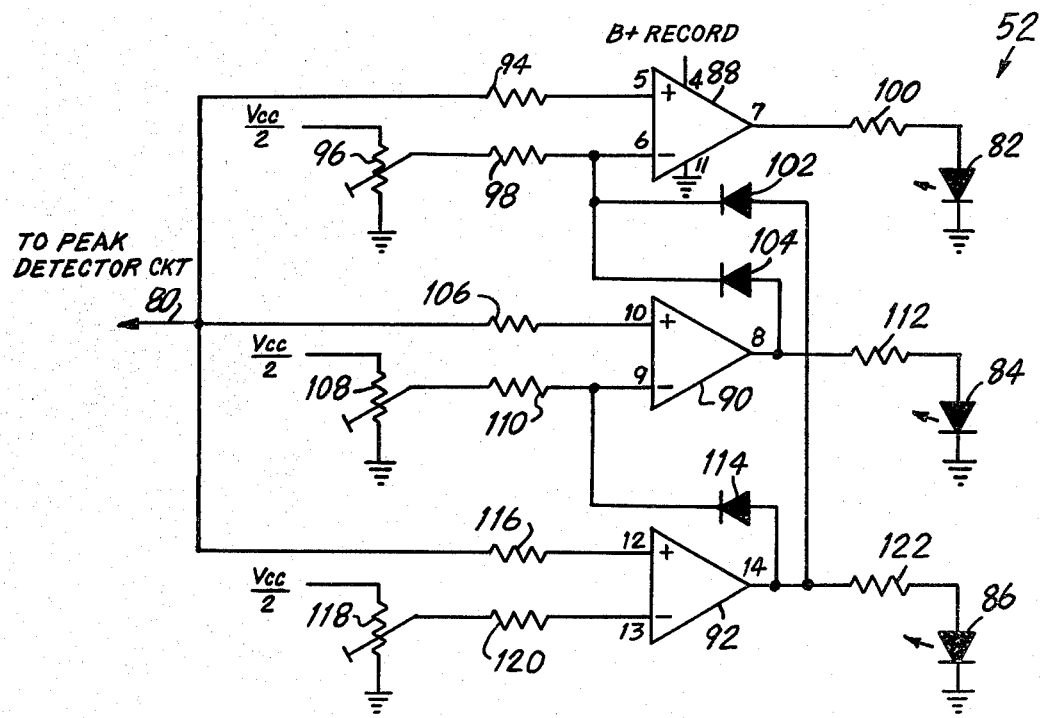
FIG. 3 is a schematic circuit diagram of the display circuitry of the instant invention.

FIG. 3 illustrates a preferred embodiment of the display 54. Display 54 includes three light-emitting diodes (LEDs) 82, 84 and 86 and the circuit permits only one diode to be lit at any one time. LED 82 may be green, LED 84 yellow, and LED 86 red, as appropriate visual indications in conjunction with the state of operation of the headroom extension system. Three noninverting amplifiers 88, 90 and 92 are used to control the operation of LEDs 82, 84 and 86, respectively.

The output of amplifier 88 is connected to LED 82 through a resistor 100. The + input of amplifier 88 is connected to conductor 80 through a resistor 94. A potentiometer 96 connected to Vcc/2 and ground and a resistor 98 connected to the − input of amplifier 88 are used to vary the point of operation of LED 82. A diode 102 is connected from the output of amplifier 92 to the − input of amplifier 88 to switch LED 82 off when LED 86 is illuminated. Similarly, a diode 104 is connected from the output of amplifier 90 to the − input of amplifier 88 to turn LED 82 off when LED 84 is illuminated. The + input of amplifier 90 is connected to conductor 80 through a resistor 106. A potentiometer 108 connected to Vcc/2 and ground and a resistor 110 are connected to the − input of amplifier 90 and are used to vary the point of operation of LED 84 which is coupled to the output of amplifier 80 through a resistor 112. A diode 114 connected from the output of amplifier 92 to the − input of amplifier 90 will switch off LED 82 when LED 86 is illuminated. The + input of amplifier 92 is connected to conductor 80 through a resistor 116. A potentiometer 118 connected to Vcc/2 and ground and a resistor 120 are connected to the − input of amplifier 92 are used to vary the operating point of amplifier 92 whose output is connected to LED 86 through a resistor 122.

Potentiometer 96 is adjusted so that when no change in DC voltage appears on conductor 80 (indicating linear operation of the headroom extension system), LED 82 alone will be illuminated. Potentiometer 108 is adjusted so that when an increased voltage appears on conductor 80, amplifier 90 will be activated and thus LED 84 alone will be illuminated to indicate that headroom extension circuitry has reduced the bias to a minimum. Potentiometer 118 is adjusted so that when an input voltage of the tape deck on channels 8 and 10 is approximately 2 dB above the operation point of amplifier 90, amplifier 92 will be activated, and LED 86 alone will be illuminated to signal the onset of tape saturation.

The circuits described above are merely a single embodiment of any one of a number of possible circuits which would give results similar to the circuit described above. An op amp such as the quad configuration integrated circuit LM 324, has been found suitable for use as buffer amplifier 52 and amplifiers 88, 90 and 92. Transistors such as 2SC458 or 25972 have been found suitable for use as transistors 68 and 70. The various values of the components used in the circuit will depend on the voltage parameters of the tape deck in which the display is to be used. The selection of the components can be readily carried out by empirical means.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. An indicator for use with a tape recorder comprising:
   (a) sampling means for sampling the signal to be recorded for presence of high-amplitude, high-frequency signals, said sampling means providing a first control signal directly proportional to the amount of high-amplitude, high-frequency energy present in the signal to be recorded, and a second control signal inversely proportional to the amount of high-frequency, high-amplitude energy present about a predetermined threshold in the signal to be recorded, means for summing said first and second control signals,
   (b) means for selectively reducing the bias signal on the magnetic media to thereby increase the amount of recording headroom available on said media,
   (c) said bias reducing means being connected to and activated by said control signal, and
   (d) display means connected to and activated when said sum of said first and second control signals is not zero to visually display the activation of said bias reducing means to thereby display the increased recording headroom provided.

2. The indicator as claimed in claim 1, wherein said indicator includes at least first and second visual indicia, said first indicia being activated when said sum of said signals is zero, said second indicia, being activated when said summed signals is not zero.

3. The indicator as claimed in claim 1 further including a third visual indicia, said third visual indicia being activated when said summed signals is not zero and is greater than the summed signal activating said second visual indicia.

4. The indicator as claimed in claim 1, wherein said circuit includes means for selectively displaying only one of said first, second and third indicia.

5. The indicator as claimed in claim 4, wherein said peak detection means includes means for providing a decay time constant to said display means.

* * * * *